July 11, 19                  3,675,986

Filed Dec. 23, 1970

United States Patent Office 3,675,986
Patented July 11, 1972

3,675,986
REFLECTING OPTICAL SYSTEM CAPABLE OF COMPENSATING FOR THE VARIATION IN POLARIZATION MODE
Tadaaki Yamamoto and Toshiyuki Kasai, Kawasaki, Japan, assignors to Nippon Kogaku K.K., represented by Yutaka Sugi, Tokyo, Japan
Filed Dec. 23, 1970, Ser. No. 101,072
Claims priority, application Japan, Dec. 29, 1969, 45/105,203; Feb. 6, 1970, 45/10,025
Int. Cl. G02b 27/78
U.S. Cl. 350—157
2 Claims

ABSTRACT OF THE DISCLOSURE

A reflecting optical system which comprises two reflecting surfaces such as mirrors or the like equal in optical characteristics disposed to have the same plane of incidence. A first half-wavelength plate is disposed in the path of light between the two reflecting surfaces perpendicularly to the path of light and in such a manner that the axis of the first plate forms an angle of 45° with respect to the plane of incidence of the first reflecting surface. And if desired, a second half-wavelength plate is disposed in the path of emergent light from the second reflecting surface perpendicularly to the optic axis of the path of emergent light and in such a manner that the axis of the second plate forms an angle of 45° with respect to the plane of incidence of the second reflecting surface, whereby the light emergent from the optical system is always ensured to present to same mode of polarization as that of the incident light.

BACKGROUND OF THE INVENTION

Field of the invention

This invention relates to a reflecting optical system of the type which is capable of compensating for the variation in polarization mode between the lights incident on and emergent from the optical system.

Description of the prior art

It is widely known that light as it is reflected by a reflecting surface such as mirror or the like presents a mode of polarization different from that presented by light as it is incident on the reflecting surface. To solve this problem, the prior art has sometimes resorted to the use of a compensating plate or the like which vary the mode of polarization of the emergent light so as to compensate for the variation in polarization mode between the incident and emergent lights. However, this has involved a disadvantage that the amount of compensation provided by such compensator must be varied in acordance with the change of the mode of polarization presented by the incident light.

SUMMARY OF THE INVENTION

It is the main object of the present invention to overcome such a disadvantage peculiar to the conventional reflecting optical system and provide a novel reflecting optical system which always ensures light emergent from the reflecting optical system to present the same mode of polarization as that of the light incident on that system.

According to the present invention, the reflecting optical system capable of compensating for the variation in polarization mode comprises first and second reflecting surfaces equal in optical characteristic which are disposed to have the same plane of incidence. According to one aspect of this invention, a first half-wavelength plate is disposed in the path of light between said two reflecting surfaces perpendicularly to the optic axis of said path of light and in such a manner that the axial orientation of said first plate forms an angle of 45° with respect to the plane containing the incident optic axis and the normal of said first reflecting surface. According to further aspect, a second half-wavelength plate is further disposed in the path of emergent light perpendicularly to the optic axis of said path of emergent light and in such a manner that the axial orientation of said second plate forms an angle of 45° with respect to the plane of incidence of said second reflecting surface.

The above features of the present invention will become more apparent from the following description of an embodiment thereof when taken in conjunction with the accompanying drawing.

DESCRIPTION OF THE PREFERRED EMBODIMENTS

Figure 1:
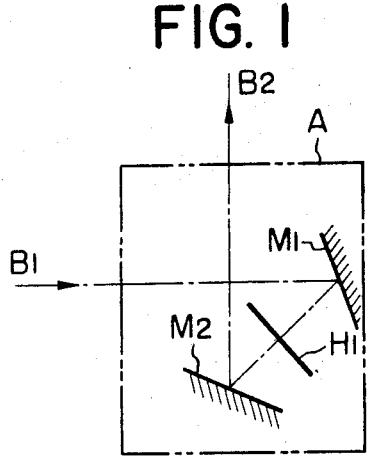
FIG. 1 is a schematic illustration of the reflecting optical system according to a first embodiment of the present invention.

Referring to FIG. 1, which shows a first embodiment, reflecting surfaces $M_1$ and $M_2$ such as mirrors or the like having equal optical characteristic, particularly equal polarization characteristic are disposed to have the same incident surface. In the path of light between the two reflecting surfaces $M_1$ and $M_2$, there is disposed a half-wavelength plate $H_1$ perpendicularly to the optic axis of that path of light and in such a manner that the axial orientation of the plate $H_1$ forms an angle of 45° with respect to the plane of incidence of the reflecting surface $M_1$, i.e. the plane containing the incident optic axis and the normal of the reflecting surface $M_1$.

In FIG. 1, $B_1$ and $B_2$ show incident light and emergent light respectively, and said two reflecting surfaces $M_1$ and $M_2$ and the half-wavelength plate $H_1$ constitute a reflecting optical system generally indicated by A.

Description will now be made as to how the polarization of the emergent light beam $B_2$ has the constant relation with that of the incident light beam $B_1$.

If the incident light beam $B_1$ is divided into two components, i.e. the component in the plane of incidence and the component in the vertical plane, the polarization of the incident light beam $B_1$ at is passes through the reflecting optical system A may be analyzed by the use of Jones matrix, as follows:

$$\begin{pmatrix} R_p & 0 \\ 0 & R_s \end{pmatrix} \begin{pmatrix} \cos\theta & -\sin\theta \\ \sin\theta & \cos\theta \end{pmatrix} \begin{pmatrix} 1 & 0 \\ 0 & -1 \end{pmatrix} \begin{pmatrix} \cos\theta & \sin\theta \\ -\sin\theta & \cos\theta \end{pmatrix} \begin{pmatrix} R_p & 0 \\ 0 & R_s \end{pmatrix} \begin{pmatrix} X \\ y \end{pmatrix} = \begin{pmatrix} y \\ x \end{pmatrix}$$

where $x = R_p e^{i\delta_p}$, $y = R_s e^{i\delta_s}$, $R_p$ and $R_s$ represent the reflected components in the plane of incidence and the vertical plane of the reflecting surfaces $M_1$ and $M_2$, respectively, and $\theta$ represents the angle (45°) which the axial orientation of the half-wavelength plate $H_1$ forms with respect to the planes of incidence of the respective reflecting surfaces $M_1$ and $M_2$.

As will be seen from the foregoing equation, the mode of polarization of the emergent light beam $B_2$ is in the constant relation with that of the incident light beam $B_1$.

Thus, according to the present invention, there is provided a reflecting optical system which always ensures the light emergent from the optical system to present the mode of polarization having the constant relation with the light incident on the optical system, independently of the variable mode of polarization occurring in the latter. The respective orientations of the reflecting surfaces are symmetrical relative to the half-wavelength plate, and when the incident light is rightly polarized light, then the emergent light is leftly polarized light and both have the same value of ellipticity.

Figure 2:
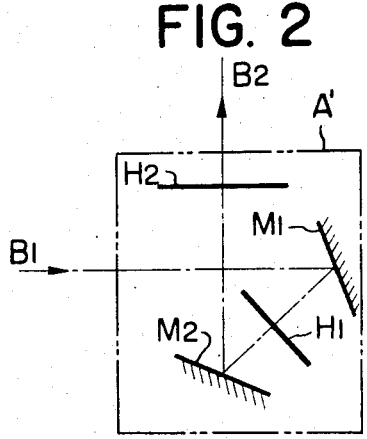
FIG. 2 shows a second embodiment of the present invention.

In FIG. 2, there is shown a second embodiment, in which the reflecting surfaces $M_1$ and $M_2$ have the same optical characteristics especially in its polarization characteristic and are disposed as symmetrical with respect to the half-wavelength plate $H_1$. In the path of light between the two reflecting surfaces $M_1$ and $M_2$, there is disposed a half-wavelength plate $H_1$ as mentioned in the first embodiment. In the second embodiment, there is disposed another half-wavelength plate $H_2$ in the path of emergent light from the reflecting surface $M_2$ perpendicularly to the optical axis of that path of emergent light and in such a manner that the axial orientation of the plate $H_2$ forms an angle of 45° with respect to the plane of incidence of reflecting surface $M_2$. Thus, an incident light beam $B_1$ is reflected by the reflecting surface $M_1$ to reach the other reflecting surface $M_2$ through the half-wavelength plate $H_1$ and then directed as an emergent light beam $B_2$ from the reflecting surface $M_2$ through the other half-wavelength plate $H_2$ in the manner as shown. The two reflecting surfaces $M_1$ and $M_2$ together with the two half-wavelength plates $H_1$ and $H_2$ constitute reflecting surfaces $M_1$ and $M_2$ together with the two half-wavelength plates $H_1$ and $H_2$ constitute a reflecting optical system of the present invention generally indicated by the letter $A'$.

Now it is explained that the emergent light beam $B_2$ presents the same mode of polarization as that presented by the incident light beam $B_1$ in the above-described reflecting optical system $A'$.

If the incident light beam $B_1$ is divided into two components, i.e. the component in the plane of incidence and the component in the vertical plane, the polarization of the incident light beam $B_1$ as it passes through the reflecting optical system $A'$ is analyzed by the use of Jones matrix as follows:

$$\begin{pmatrix}\cos\theta & -\sin\theta \\ \sin\theta & \cos\theta\end{pmatrix}\begin{pmatrix}1 & 0 \\ 0 & -1\end{pmatrix}\begin{pmatrix}\cos\theta & \sin\theta \\ -\sin\theta & \cos\theta\end{pmatrix}\begin{pmatrix}R_p & 0 \\ 0 & R_s\end{pmatrix}$$

$$\begin{pmatrix}\cos\theta & -\sin\theta \\ \sin\theta & \cos\theta\end{pmatrix}\begin{pmatrix}1 & 0 \\ 0 & -1\end{pmatrix}\begin{pmatrix}\cos\theta & \sin\theta \\ -\sin\theta & \cos\theta\end{pmatrix}\begin{pmatrix}R_p & 0 \\ 0 & R_s\end{pmatrix}\begin{pmatrix}x \\ y\end{pmatrix}=\begin{pmatrix}x \\ y\end{pmatrix}$$

where $x=R_p e^{i\delta p}$, $y=R_s e^{i\delta s}$, $R_p$ and $R_s$ represent the reflected components in the plane of incidence and the vertical plane of the reflecting surfaces $M_1$ and $M_2$, respectively, and $\theta$ represents an angle (45°) with the axial orientations of the half-wavelength plates $H_1$ and $H_2$ form with respect to the planes of incidence of the reflecting surfaces $M_1$ and $M_2$.

As apparent from the above equation, the polarization of the emergent light beam $B_2$ is quite equal to that of the incident light beam $B_1$.

We claim:

1. A reflecting optical system capable of compensating for the variation in polarization mode, comprising first and second reflecting surfaces having the same optical characteristics and disposed to have the same incident surface, a half-wavelength plate disposed in the path of light between said two reflecting surfaces perpendicularly to the optical axis of said path of light, the axial orientation of the plate forming an angle of 45 degrees with respect to the plane including the incident light axis and the normal of the first reflecting surface.

2. A reflecting optical system according to claim 1, wherein said first and second reflecting surfaces opposed to each other symmetrically and the incident and emergent optical axis of the reflecting optical system intersecting each other, and the optical system further comprises another half-wavelength plate disposed in the path of emergent light from said second reflecting surface perpendicularly to the optic axis of said path of emergent light and the axial orientation of said another plate forms an angle of 45 degrees with respect to the light of incidence of said second reflecting surface.

References Cited

UNITED STATES PATENTS 3,510,198  5/1970  Pace.

DAVID SCHONBERG, Primary Examiner

P. R. MILLER, Assistant Examiner

U.S. Cl. X.R.

350—147, 152, 288

UNITED STATES PATENT OFFICE
CERTIFICATE OF CORRECTION

Patent No. 3,675,986        Dated July 11, 1972

Inventor(s) Tadaaki Yamamoto and Toshiyuki Kasai

It is certified that error appears in the above-identified patent and that said Letters Patent are hereby corrected as shown below:

Col. 2, lines 57 through 59, the formula should read as follows:

$$\begin{pmatrix} R_p & 0 \\ 0 & R_s \end{pmatrix} \begin{pmatrix} \cos\theta & -\sin\theta \\ \sin\theta & \cos\theta \end{pmatrix} \begin{pmatrix} 1 & 0 \\ 0 & -1 \end{pmatrix} \begin{pmatrix} \cos\theta & \sin\theta \\ -\sin\theta & \cos\theta \end{pmatrix} \begin{pmatrix} R_p & 0 \\ 0 & R_s \end{pmatrix} \begin{pmatrix} x \\ y \end{pmatrix} = \begin{pmatrix} y \\ x \end{pmatrix}$$

Col. 4, lines 3 through 8, the formula should read as follows:

$$\begin{pmatrix} \cos\theta & -\sin\theta \\ \sin\theta & \cos\theta \end{pmatrix} \begin{pmatrix} 1 & 0 \\ 0 & -1 \end{pmatrix} \begin{pmatrix} \cos\theta & \sin\theta \\ -\sin\theta & \cos\theta \end{pmatrix} \begin{pmatrix} R_p & 0 \\ 0 & R_s \end{pmatrix} \begin{pmatrix} \cos\theta & -\sin\theta \\ \sin\theta & \cos\theta \end{pmatrix} \begin{pmatrix} 1 & 0 \\ 0 & -1 \end{pmatrix}$$

$$\begin{pmatrix} \cos\theta & \sin\theta \\ -\sin\theta & \cos\theta \end{pmatrix} \begin{pmatrix} R_p & 0 \\ 0 & R_s \end{pmatrix} \begin{pmatrix} x \\ y \end{pmatrix} = \begin{pmatrix} x \\ y \end{pmatrix}$$

Signed and sealed this 8th day of October 1974.

(SEAL)
Attest:

McCOY M. GIBSON JR.        C. MARSHALL DANN
Attesting Officer        Commissioner of Patents